(12) United States Patent
Nishiie et al.

(10) Patent No.: US 10,275,753 B2
(45) Date of Patent: Apr. 30, 2019

(54) INFORMATION PROCESSING APPARATUS AND SECURITY CONTROL METHOD

(71) Applicant: TOSHIBA TEC KABUSHIKI KAISHA, Tokyo (JP)

(72) Inventors: Toru Nishiie, Numazu Shizuoka (JP); Masatoshi Nochi, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 367 days.

(21) Appl. No.: 14/991,327

(22) Filed: Jan. 8, 2016

(65) Prior Publication Data
US 2016/0232508 A1 Aug. 11, 2016

(30) Foreign Application Priority Data
Feb. 9, 2015 (JP) .................... 2015-023583

(51) Int. Cl.
*G06Q 20/00* (2012.01)
*G06Q 20/20* (2012.01)
(Continued)

(52) U.S. Cl.
CPC ......... *G06Q 20/206* (2013.01); *G06F 1/1632* (2013.01); *G06F 21/31* (2013.01); *G06F 21/32* (2013.01); *G07F 7/088* (2013.01); *G07F 7/1025* (2013.01); *G07G 1/0018* (2013.01); *H04L 9/3231* (2013.01); *H04L 9/3234* (2013.01); *G06Q 20/40145* (2013.01); *H04L 63/0861* (2013.01)

(58) Field of Classification Search
CPC ............................ G06Q 20/206; G06F 1/1632

USPC .......................................................... 705/18
See application file for complete search history.

(56) References Cited

U.S. PATENT DOCUMENTS

2009/0252387 A1* 10/2009 Higuchi ............ G06K 9/00033
382/124
2009/0253410 A1 10/2009 Fitzgerald et al.
(Continued)

FOREIGN PATENT DOCUMENTS

JP 2012-137979 7/2012

OTHER PUBLICATIONS

Chinese First Office Action dated Apr. 17, 2018, filed in counterpart Chinese Patent Application No. 201610078460.5 (20 pages) (with translation).

*Primary Examiner* — Rokib Masud
(74) *Attorney, Agent, or Firm* — Kim & Stewart LLP

(57) ABSTRACT

In one embodiment, an information processing apparatus is mountable on and demountable from a docking station, and has an input device, an acquisition unit to acquire information indicating an operator for user authentication, and a processor. When the apparatus is mounted on the docking station, the processor permits acceptance of the operation input by the input device, without starting up the acquisition unit. When the apparatus is demounted from the docking station, the processor starts up the acquisition unit, and performs user authentication based on the information indicating the operator which has been acquired by the started up acquisition unit. When the operator is approved as a specific operator of the information processing apparatus, as a result of the user authentication, the processor permits acceptance of the operation input by the input device.

9 Claims, 7 Drawing Sheets

(51) Int. Cl.
  G06F 1/16    (2006.01)
  G06F 21/32   (2013.01)
  H04L 9/32    (2006.01)
  G06F 21/31   (2013.01)
  G07G 1/00    (2006.01)
  G07F 7/08    (2006.01)
  G07F 7/10    (2006.01)
  G06Q 20/40       (2012.01)
  H04L 29/06       (2006.01)

(56) References Cited

U.S. PATENT DOCUMENTS

2012/0174199 A1   7/2012  Perrin et al.
2015/0096013 A1*  4/2015  Ozolins .................. G06F 21/32
                                                 726/19

\* cited by examiner

INFORMATION PROCESSING APPARATUS AND SECURITY CONTROL METHOD

CROSS-REFERENCE TO RELATED APPLICATION

This application is based upon and claims the benefit of priority from the prior Japanese Patent Application No. 2015-023583, filed on Feb. 9, 2015, the entire contents of which are incorporated herein by reference.

FIELD

Embodiments described herein relate generally to an information processing apparatus and a security control method of an information processing apparatus.

BACKGROUND

Recently, a commodity sales data processing apparatus has become widespread in which a portable information processing apparatus mounting a touch panel, such as a tablet terminal (called also a tablet PC) is detachably combined with a stationary docking station.

In the commodity sales data processing apparatus of this kind, the information processing apparatus has a registration function of commodity sales data, and a settlement function by a credit card, for example.

Accordingly, a sales clerk in charge of customer service carries the information processing apparatus, and thereby can complete the registration and settlement of a commodity which a customer has purchased in a sales room.

Usually, an information processing apparatus which has been mounted on a docking station can be demounted by a simple operation. For the reason, a person who is not in charge of customer service might demount an information processing apparatus from a docking station to bring out it, and might perform various illegal operations.

DETAILED DESCRIPTION

Figure 1:
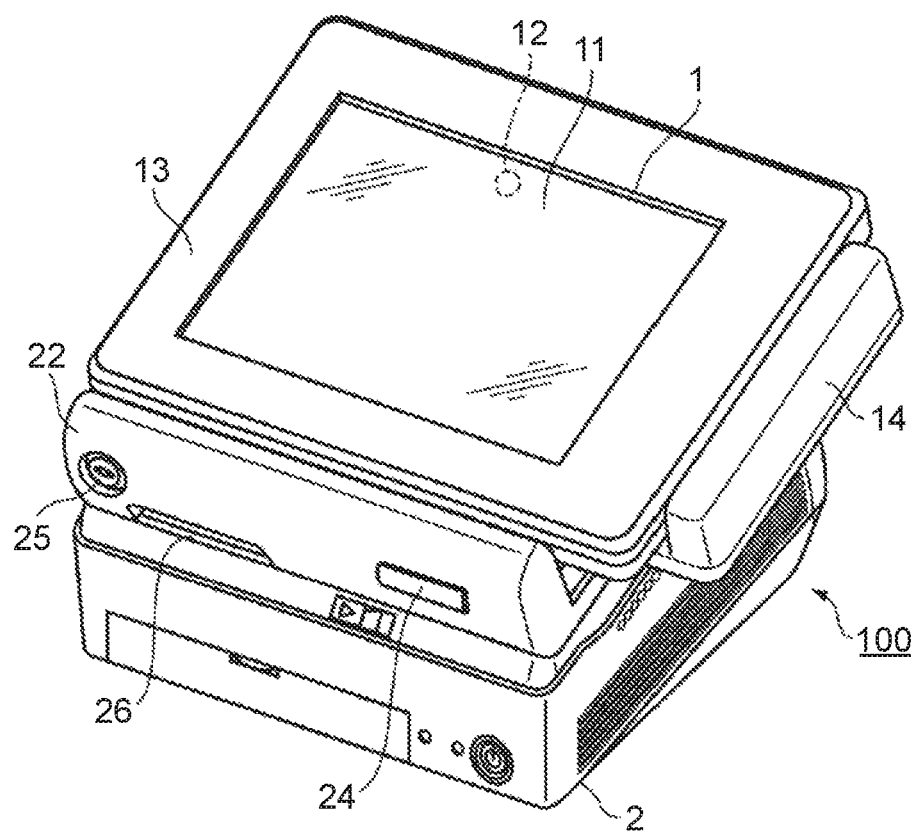
FIG. 1 is a perspective view showing a commodity sales data processing apparatus in the state that a tablet terminal is mounted on a docking station, in an embodiment.

According to one embodiment, an information processing apparatus is mountable on and demountable from a docking station. The information processing apparatus has an input device, an acquisition unit, and a processor.

The input device accepts an operation input by an operator.

The acquisition unit acquires information indicating the operator.

When the information processing apparatus is mounted on the docking station, the processor permits acceptance of the operation input of the operator by the input device without starting up the acquisition unit. When the information processing apparatus is demounted from the docking station, the processor starts up the acquisition unit, and performs user authentication based on the information indicating the operator which has been acquired by the started up acquisition unit. Further, when the operator is approved as a specific operator of the information processing apparatus, based on a result of the user authentication, the processor permits acceptance of the operation input by the input device.

Hereinafter, further embodiments will be described with reference to the drawings. In the drawings, the same symbols indicate the same or similar portions.

An information processing apparatus of an embodiment can be protected from being demounted from a docking station and being illegally used.

Figure 2:
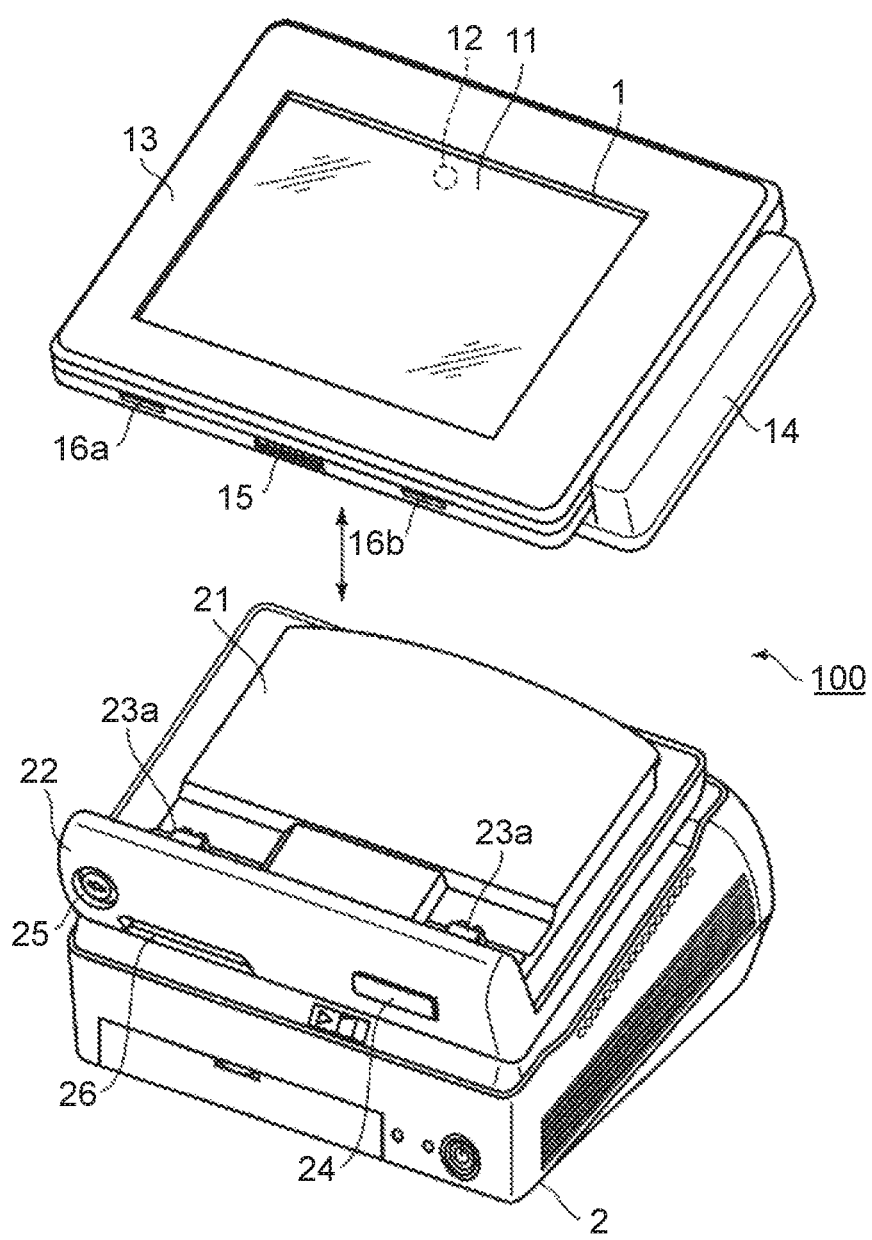
FIG. 2 is a perspective view showing the commodity sales data processing apparatus in the state that the tablet terminal is demounted from the docking station, in the embodiment.

FIG. 1 and FIG. 2 are perspective views each showing an external appearance of a commodity sales data processing apparatus 100 according to an embodiment.

The commodity sales data processing apparatus 100 includes a tablet terminal 1 that is an aspect of an information processing apparatus, and a docking station 2 on which this tablet terminal 1 is to be detachably mounted.

The tablet terminal 1 accepts an operation input of a specific operator (a person in charge of customer service) described later, and thereby performs processing of information relating to registration of a commodity which a customer purchases, and information relating to settlement of a price of the commodity, for example. In the following description, the above-described processing which the tablet terminal 1 performs may simply be called an information processing.

FIG. 1 shows the state that the tablet terminal 1 is mounted on the docking station 2.

FIG. 2 shows the state that the tablet terminal 1 is demounted from the docking station 2.

The tablet terminal 1 is portable by an operator such as a person in charge of customer service. The tablet terminal 1 has a rectangular flat plate shape as an easily portable shape. The tablet terminal 1 is an electronic device wherein a display screen 11 is provided on a most part of the surface.

Figure 3:
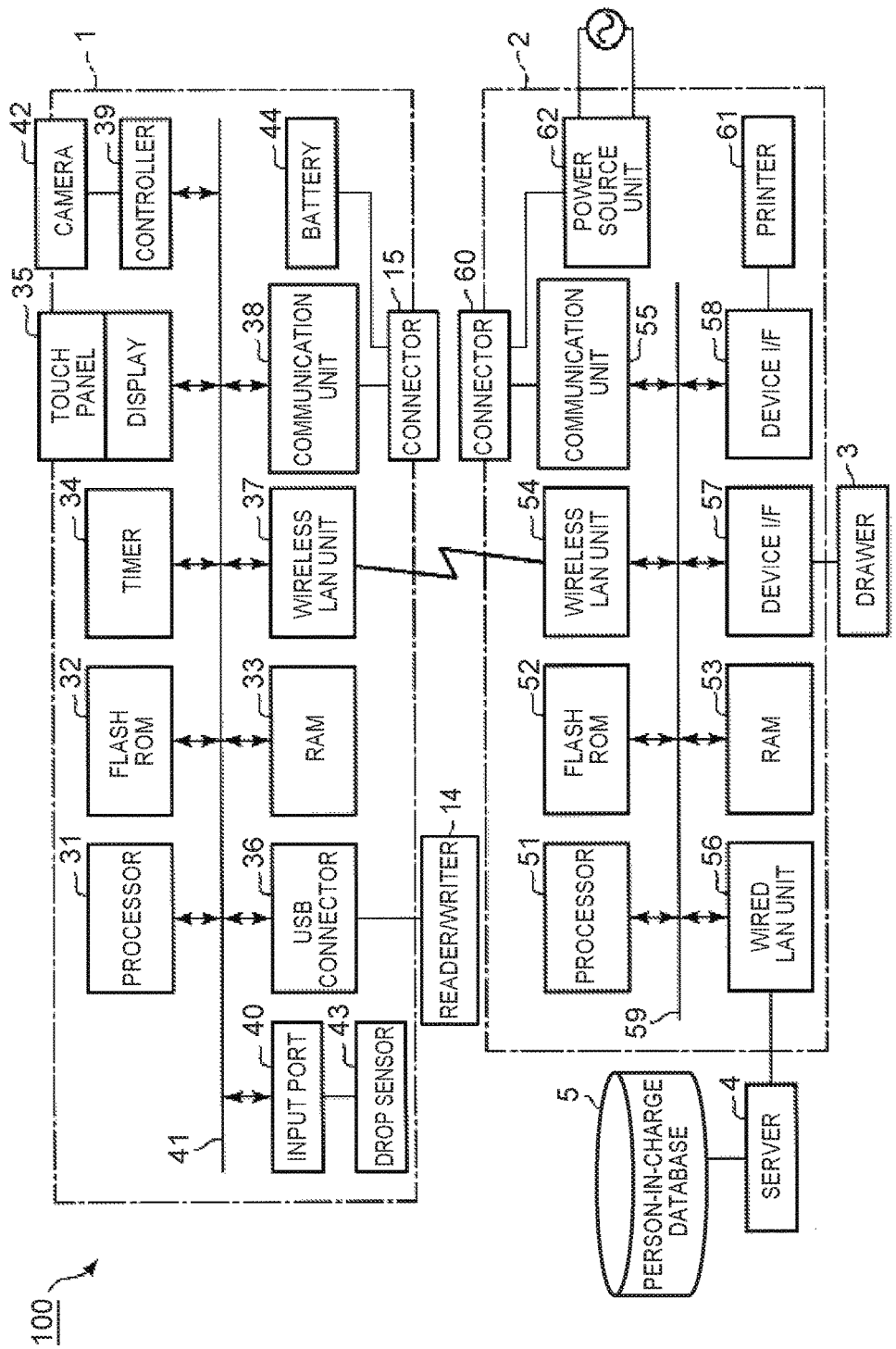
FIG. 3 is a block diagram showing a configuration of main portions of the tablet terminal and the docking station according to the embodiment.

The display screen 11 has a touch panel 35 (refer to FIG. 3).

The touch panel 35 functions as an input device and a display device.

The input device accepts an operation input by an operator.

The operator is a person who tries to operate the tablet terminal 1. In addition, a person which is operating the tablet terminal 1 may be called an operator.

The input device accepts an operation input by an operator, to accept an input of data mainly relating to commodity sales.

In addition, the touch panel 35 also has a sign pad function for performing a signature input of a credit card user and reception confirmation thereof, for example.

The tablet terminal 1 has an acquisition unit to acquire information indicating an operator for user authentication.

The above-described information indicating an operator includes biological information of an operator.

The above-described biological information of an operator is a face image of the operator, for example.

The tablet terminal 1 incorporates a camera 42 (refer to FIG. 3) for photographing an image of an operator, for example, as the above-described acquisition unit.

The camera 42 makes a light incident through an imaging lens 12 arranged in the vicinity of the edge of the display screen 11 form an image on an imaging element, to take in a frame image of an imaging area. As the imaging element, a CMOS image sensor is used, for example.

The periphery of the tablet terminal 1 is covered with a jacket 13 for housing an electronic device.

The jacket 13 houses the tablet terminal 1 in the state that the display screen 11 is exposed.

The display screen 11 of the tablet terminal 1 housed in the jacket 13 is arranged at a position slightly recessed from an edge of the jacket 13.

With this arrangement, even when the tablet terminal 11 is dropped on a floor or the like by mistake, the display screen 11 can be prevented from being damaged.

A reader/writer 14 is fitted on the jacket 13.

The reader/writer 14 reads data recorded in a data card.

In addition, the reader/writer 14 writes data into a data card.

The card includes a settlement card such as a credit card, a debit card, an electronic money card, a prepaid card, and in addition, includes various cards for recording information relating to settlement processing, such as a membership card, a point card.

The reader/writer 14 may be any device of a magnetic type, a contact type, or a non-contact type, and may include plural kinds of devices.

In addition, in FIGS. 1, 2, a case that the reader/writer 14 is of a magnetic type is shown.

The tablet terminal 1 can be carried easily.

For this reason, in the case of a magnetic type reader/writer 14, skimming is worried about wherein it is illegally brought out, and data of the magnetic card is stolen.

Accordingly, in order to prevent skimming, it is desirable to fit a tamper detection mechanism that is a falsification detection function on the tablet terminal 1 or the reader/writer 14.

The jacket 13 has a connector 15, and a pair of locking holes 16a, 16b.

The connector 15 electrically connects to the docking station 2, as described later.

The locking holes 16a, 16b mechanically connect to the docking station 2, as described later.

The locking holes 16a, 16b are formed at the both sides to sandwich the connector 15 therebetween.

The docking station 2 has a mounting surface 21 for the tablet terminal 1 at an upper surface of a chassis which is placeable on a table or the like.

The docking station 2 has an abutting portion 22 which is erected at the front side of this mounting surface 21. When the tablet terminal 1 is mounted on the docking station 2, the tablet terminal 1 is pressed to the abutting portion 22.

At the mounting surface 21 side of the abutting portion 22, a connector 60 (refer to FIG. 3) and a pair of locking claws 23a, 23b are provided.

An operator mounts the tablet terminal 1 on the mounting surface 21, in the state that the display screen 11 faces upward.

At this time, the operator presses the surface of the jacket 13 on which the connector 15 and the locking holes 16a, 16b are provided to the abutting portion 22.

By this pressing, the connector 15 of the jacket 13 side and the connector 60 at the abutting portion 22 side electrically connect to each other.

With this electrical connection, wired communication becomes possible between the tablet terminal 1 and the docking station 2.

In addition, a battery 44 (refer to FIG. 3) provided in the tablet terminal 1 is charged by power feeding from the docking station 2 side.

In addition, the operator presses the tablet terminal 1 to the abutting portion 22, and thereby the locking claws 23a, 23b of the abutting portion 22 side are respectively inserted into the locking holes 16a, 16b of the jacket 13 side.

And the locking claws 23a, 23b are locked at the edges of the locking holes 16a, 16b, respectively.

With this locking, the tablet terminal 1 is mechanically connected to the docking station 2.

The tablet terminal 1 is electrically connected to the docking station 2, and mechanically connected to, as described above, and thereby the tablet terminal 1 is mounted on the docking station 2.

A mounting release lever 24 and a cylinder lock 25 are provided on an opposite surface to the mounting surface 21 of the abutting portion 22.

In order that an operator releases the state that the tablet terminal 1 is mounted on the docking station 2 as described above, that is, in order that an operator demounts the tablet terminal 1 from the docking station 2, the mounting release lever 24 is operated by the operator.

The mounting release lever 24 is slidable in the horizontal direction, and interlocks with the locking claws 23a, 23b. That is, the mounting release lever 24 is slid by an operator in any one direction, and thereby the respective locked states of the locking claws 23a, 23b and the locking holes 16a, 16b are released.

The cylinder lock 25 is a lock which is operated by an operator using a specific key, in order to lock the state that the tablet terminal 1 is mounted on the docking station 2 as described above.

The cylinder lock 25 is operated by the operator, to fix the mounting release lever 24.

When the mounting release lever 24 is fixed, the operator becomes unable to demount the tablet terminal 1 from the docking station 2.

Accordingly, it is possible to prevent in advance that the tablet terminal 1 is illegally demounted from the docking station 2, and is stolen.

A drawer 3 (refer to FIG. 3) for housing cash and so on is connected to the docking station 2.

In addition, the docking station 2 incorporates a printer 61 (refer to FIG. 3) for printing a receipt.

The docking station 2 issues a receipt which has been printed by the printer 61 from a receipt issuing port 26.

The tablet terminal 1 and the docking station 2 respectively incorporate wireless LAN units 37, 54 (refer to FIG. 3) based on Wi-Fi (registered trademark) standard, for example. Hereinafter, the wireless LAN units 37, 54 are called wireless units 37, 54.

With these wireless units 37, 54, wireless communication is enabled between the tablet terminal 1 and the docking station 2, in the state that the tablet terminal 1 is demounted from the docking station 2, as shown in FIG. 2, for example.

FIG. 3 is a block diagram showing a configuration of main portions of the tablet terminal 1 and the docking station 2.

The tablet terminal 1 has a processor 31, a flash ROM (Read Only Memory) 32, a RAM (Random Access Memory) 33, a timer 34, the touch panel 35, a USB (Universal Serial Bus) connector 36, the wireless unit 37, a communication unit 38, a camera controller 39 and an input port 40.

The processor 31, the flash ROM 32, the RAM 33, the timer 34, the touch panel 35, the USB connector 36, the wireless unit 37, the communication unit 38, the camera controller 39 and the input port 40 are connected by a system transmission path 41 such as an address bus, a data bus, a control signal lines.

In addition, the tablet terminal 1 has the connector 15, the camera 42, a drop sensor 43 and the battery 44.

The connector 15 is connected to the communication unit 38.

The camera 42 is connected to the camera controller 39.

The drop sensor 43 is connected to the input port 40. The battery 44 is connected to the connector 15.

The tablet terminal 1 composes a computer by the processor 31, the flash ROM 32 and the RAM 33, and the system transmission path 41 connecting these.

The processor 31 corresponds to a central unit of the above-described computer. The processor 31 controls respective units of the tablet terminal 1, in accordance with an operating system and an application program, so as to realize various functions as the tablet terminal 1.

The flash ROM 32 corresponds to a main storage unit of the above-described computer.

The flash ROM 32 stores the above-described operating system and application program.

The flash ROM 32 may store data required when the processor 31 executes various processings.

The RAM 33 corresponds to a main storage unit of the above-described computer.

The RAM 33 stores data required when the processor 31 executes various processings, if necessary.

In addition, the RAM 33 is used as a work area when the processor 31 performs various processings.

The timer 34 counts present date and time.

The touch panel 35 has a panel type display that is a display device.

The touch panel 35 has a touch sensor, that is an input device, arranged on the above-described display.

The display screen 11 of the tablet terminal 1 includes a screen of a display on which this touch sensor is arranged.

The USB connector 36 is a connector for detachably connecting various USB devices having a communication system based on USB standard.

In the present embodiment, the reader/writer 14 is connected to the USB connector 36.

The wireless unit 37 is a wireless unit capable of performing data communication with other device via a wireless LAN, for example.

The wireless unit 37 mainly performs wireless data communication with the docking station 2, for example.

The communication unit 38 performs data communication with the docking station 2 to be connected via the connector 15.

As the communication unit 38, a USB communication device is used, for example.

The camera controller 39 controls on-off of photographing of the camera 42.

In addition, the camera controller 39 takes in an image photographed by the camera 42, and writes the image into an image buffer of the RAM 33.

The input port 40 inputs a detection signal of the drop sensor 43.

The drop sensor 43 detects a drop of the tablet terminal 1.

As the drop sensor 43, an acceleration sensor which detects acceleration generated when the tablet terminal 1 drops, or a shock sensor which detects shock generated when the tablet sensor 1 drops, or the like is used.

The docking station 2 has a processor 51, a flash ROM 52, a RAM 53, the wireless unit 54, a communication unit 55, a wired LAN unit 56 and a plurality of device interfaces 57, 58.

The processor 51, the flash ROM 52, the RAM 53, the wireless unit 54, the communication unit 55, the wired LAN unit 56 and the plurality of device interfaces 57, 58 are connected by a system transmission path 59 such as an address bus, a data bus, a control signal line.

In addition, the docking station 2 has the connector 60, the printer 61 and a power source unit 62.

Further, the docking station 2 connects to external devices such as the drawer 3 for housing cash, and a POS (Point Of Sales) server 4.

The connector 60 is connected to the communication unit 55.

The printer 61 is connected to the device interface 58.

The power source unit 62 is connected to the connector 60.

The drawer 3 is connected to the device interface 57.

The POS server 4 is connected to the wired LAN unit 56.

The docking station 2 composes a computer by the processor 51, the flash ROM 52 and RAM 53, and the system transmission path 59 connecting these.

The processor 51 corresponds to a central unit of the above-described computer.

The processor 51 controls respective units of the docking station 2, in accordance with an operating system and an application program, so as to realize various functions as the docking station 2.

The flash ROM 52 corresponds to a main storage unit of the above-described computer.

The flash ROM 52 stores the above-described operating system and application program.

The flash ROM 52 may store data required when the processor 51 executes various processings.

The RAM 53 corresponds to a main storage unit of the above-described computer.

The RAM 53 stores data required when the processor 51 executes various processings, if necessary.

In addition, the RAM 53 is used as a work area when the processor 51 performs various processings.

The wireless unit 54 is a wireless LAN unit capable of performing data communication with other device, via a wireless LAN unit, for example.

The wireless unit 54 mainly performs wireless communication with the tablet terminal 1, for example.

The communication unit 55 performs data communication with the tablet terminal 1 to be connected via the connector 60.

As the communication unit 55, a USB communication device is used, for example.

The wired LAN unit 56 performs data communication with the POS server 4 connected via a wired LAN.

As the wired LAN unit 56, an existing communication device and so on, based on IEEE 802.3 series standard are used, for example.

Each of the device interfaces 57, 58 electrically connects various device equipments, and transmits and receives a data signal with these device equipments.

The docking station 2 connects the drawer 3 to the device interface 57, and connects the printer 61 for printing receipt to the device interface 58.

In addition the number of the device interfaces 57, 58 is not limited to two, but it may be one, or may be three or more.

In addition, the above-described device equipments are not limited to the drawer 3 and the printer 61.

For example, a bar code scanner, a display which is used a display for customer, and so on can be connected to the device interfaces 57, 58.

The power source unit 62 generates power required for driving the docking station 2, and feeds the power to the respective units of the docking station 2.

In addition the power source unit 62 has a function to charge the battery 44 of the tablet terminal 1.

While the tablet terminal 1 is mounted on the mounting surface 21 of the docking station 2, and the connector 60 at the docking station 2 side and the connector 15 at the tablet terminal 1 side are connected, the battery 44 of this tablet terminal 1 is charged with this function.

The POS server 4 controls the registration function of the commodity sales data which the tablet terminal 1 has, and the settlement function by a credit card or the like.

The POS server 4 collects data of the commercial transaction subjected to sales processing by the tablet terminal 1 via the docking station 2 and a wired LAN, and sums up the data, and thereby manages the sales and stock and so on of the whole store.

In addition, in the present embodiment, one commodity sales data processing apparatus 100 is described, but usually, a plurality of the commodity sales data processing apparatuses 100 are used in a store.

The POS server 4 is connected to the docking stations 2 of the respective commodity sales data processing apparatuses 100 via wired LAN.

Here, the POS server 4 is connected to the tablet terminals 1 of the respective commodity sales data processing apparatuses 100 via wired LAN and a plurality of the docking stations 2, to build a POS system.

The POS system is an existing one, and accordingly the description thereof is omitted here.

In the present embodiment, the POS server 4 can access a person-in-charge database 5.

In the person-in-charge database 5, recognition data relating to a specific operator who is allowed to operate the tablet terminal 1 is stored, in order to make the tablet terminal 1 perform the above-described information processing.

Specifically, the specific operator is a person in charge of customer service.

In the person-in-charge database 5, for example, recognition data relating to a person in charge of customer service who is allowed to perform a customer service using the tablet terminal 1 is stored.

The above-described recognition data includes a unique person-in-charge ID which is assigned to each person in charge for identifying a person in charge of customer service, and data of a face image of the relevant person in charge. The unique person-in-charge ID is data of a number, a symbol, an alphabet, an abbreviated name which are unique to a person in charge of customer service, a combination thereof, and so on.

In a store which has introduced the commodity sales data processing apparatus 100, the tablet terminal 1 is mounted on the docking station 2, and thereby the connectors 15, 60 are connected to each other.

For example, when a customer visits the store, a person in charge of customer service demounts the tablet terminal 1 from the docking station 2.

The person in charge of customer service performs a customer service while carrying the tablet terminal 1, and operates the tablet terminal 1 for the processing of registration of a commodity which the customer purchases and settlement of a price of the commodity.

In addition, the tablet terminal 1 can perform the information processing relating to registration of the commodity and the information processing relating to settlement of the price, even in the state to be mounted on the docking station 2.

As described above, the tablet terminal 1 which is to be used mainly in the affairs relating to commercial transaction is demounted from the docking station 2, and can be carried.

For this reason, a person other than a person in charge of customer service (a specific operator) might bring out the tablet terminal 1, to perform an illegal operation.

Accordingly, the tablet terminal 1 of the present embodiment is mounted with a security program described below so as to prevent an illegal operation of this kind.

The security program is installed in the flash ROM 32, for example.

The security program includes a security level setting program, a first security control program, and a second security control program. Any of these programs starts up when the power source of the tablet terminal 1 is turned ON, and then keeps the start-up state until the power source is turned OFF.

Hereinafter, main portion of information processing which the processor 31 of the tablet terminal 1 executes, in accordance with various security programs, will be described using flow charts of FIG. 4 to FIG. 7.

To begin with, a control processing which the processor executes in accordance with the security level setting program will be described using FIG. 4.

The security level setting program is a program which the processor 31 executes so as to change security level data described later, in accordance with mounting and demounting of the tablet terminal 1 on and from the docking station 2. Further, the security setting program is a program which the processor 31 executes so as to perform user authentication of a person who has demounted the tablet terminal 1 from the docking station 2.

The user authentication called here is a processing to specify whether or not a person (an operator) who has demounted the tablet terminal 1, or a person (an operator) who tries to operate the demounted tablet terminal 1 is a person (the above-described specific operator) which is allowed to operate the tablet terminal 1.

Specifically, the above-described user authentication is a processing to specify whether or not the above-described person who has demounted, or the like is a person in charge of customer service whose recognition data is stored in the above-described person-in-charge database 5.

When performing the above-described user authentication, to specify that the above-described person who has demounted, or the like is a person in charge of customer service, the processor 31 approves the above-described person who has demounted, or the like as the specific operator of the tablet terminal 1. In addition, when performing the above-described user authentication, to specify that the person who has demounted, or the like is not a person in charge of customer service, the processor 31 does not approve the above-described person who has demounted, or the like as the specific operator of the tablet terminal 1.

Figure 4:
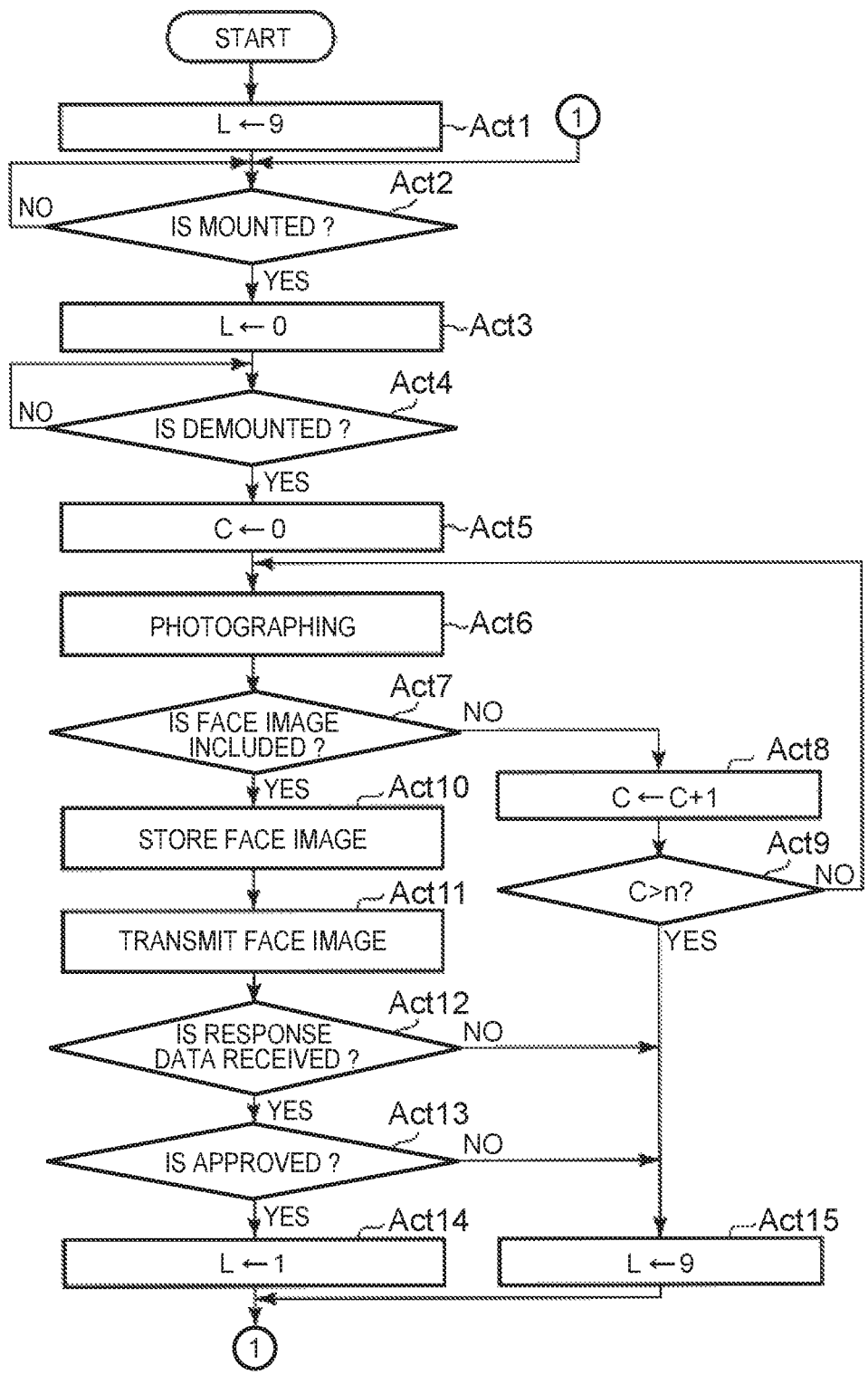
FIG. 4 is a flow chart showing a control processing for security level setting which the processor of the tablet terminal according to the embodiment executes.

When the above-described security level setting program starts up, the processor 31 starts processings of a procedure shown in a flow chart of FIG. 4.

To begin with, in Act1, the processor 31 sets security level data (hereinafter, referred to as level data) L to "9".

By the way, when the level data L is "9", the processor 31 does not accept an operation input from the touch panel 35.

That is, the level data L="9" is a level for inhibiting an operation of the tablet terminal 1.

When the level data is set to "9", the processing of the processor 31 proceeds to Act2.

In Act2, the processor 31 confirms whether the tablet terminal 1 is mounted on the docking station 2.

For example, when the tablet terminal 1 is mounted on the docking station 2, and the connectors 15, 60 are connected to each other, the tablet terminal 1 is fed with power from the docking station 2 for charging the battery 44.

The processor 31 detects presence or absence of this power feeding, to confirm the mounting state. In addition, a method of confirming the mounting state is not limited to this.

For example, a sensor to be turned ON or OFF when the tablet terminal 1 is mounted on the docking station 2 is provided, and whether or not the above-described mounting is made may be confirmed by a signal of this sensor.

When it is confirmed that the tablet terminal 1 is not mounted on the docking station 2, that is, the tablet terminal 1 is demounted from the docking station 2 (NO in Act2), the processor 31 executes the processing of Act2 again.

Accordingly, when the tablet terminal 1 is demounted from the docking station 2, in the state that the level data L is "9", the processor 31 waits until the tablet terminal 1 is mounted on the docking station 2. During this waiting, the level data L remains to be "9".

On the other hand, when it is confirmed that the tablet terminal 1 is mounted on the docking station 2 (YES in Act2), the processing of the processor 31 proceeds to Act3.

In Act 3, the processor 31 changes the level data to "0". By the way, when the level data L is "0", the processor 31 accepts an input from the touch panel 35.

In addition, as will be described later, also when the level data L is "1", the processor 31 accepts an input from the touch panel 35.

After the level data L is changed to "0", the processing of the processor 31 proceeds to Act4.

In Act4, the processor 31 confirms whether the tablet terminal 1 has been demounted from the docking station 2.

For example, the processor 31 detects presence or absence of the power feeding from the docking station 2, to confirm whether or not the above-described demounting has been made.

Or, whether or not the above-described demounting has been made is confirmed by a signal of a sensor which is turned ON or OFF when the tablet terminal 1 is mounted on the docking station 2.

When it is confirmed that the tablet terminal 1 is not demounted from the docking station 2, that is, the tablet terminal 1 is mounted on the docking station 2 (NO in Act4), the processor 31 executes the processing of Act4 again.

Accordingly, when the tablet terminal 1 is mounted on the docking station 2, the processor 31 waits until the tablet terminal 1 is demounted from the docking station 2. During this waiting, the level data L remains to be "0".

On the other hand, when it is confirmed that the tablet terminal 1 has been demounted from the docking station 2 (YES in Act4), the processing of the processor 31 proceeds to Act5.

In Act5, the processor 31 resets a retry counter C to "0". The retry counter C is stored in the RAM 33, for example.

After the retry counter C has been reset, the processing of the processor 31 proceeds to Act 6.

In Act6, the processor 31 commands the camera controller 39 to start photographing.

Having received this command, the camera controller 39 starts up the camera 42.

The processor 31 takes in a photographed frame image by the camera controller 39, and writes it in an image buffer of the RAM 33.

After the frame image has been written into the image buffer, the processing of the processor 31 proceeds to Act7.

In Act7, the processor 31 analyzes the frame image written in the image buffer, to confirm whether a face image is included in the frame image.

For example, the processor 31 extracts an outline of an object displayed in the frame image, and determines whether or not this outline and color information in the outline are similar to a pattern of a previously set face image, to confirm the presence or absence of a face image.

When it is confirmed that a face image is not included (NO in Act7), the processing of the processor 31 proceeds to Act8.

In Act8, the processor 31 counts up the retry counter C by "1".

After the retry counter C has been counted up, the processing of the processor 31 proceeds to Act9.

In Act9, the processor 31 confirms whether or not a value of the retry counter C has exceeded a prescribed value n (n>1).

When it is confirmed that the value of the retry counter C has not exceeded the prescribed value n (NO in Act9), the processing of the processor 31 returns to the above-described Act6.

That is, the processor 31 commands the camera controller 39 to start photographing.

Accordingly, the processor 31 makes the camera 42 retry photographing actions of maximum n times, until a face image is included in the frame image photographed by the camera 42.

When a face image is confirmed during photographing actions of n times (YES in Act7), the processing of the processor 31 proceeds to Act10.

In Act10, the processor 31 writes the above confirmed face image into a prescribed area of the RAM 33, to store it therein.

After the above-described face image has been stored, the processing of the processor 31 proceeds to Act11.

In Act11, the processor 31 transmits data of the above confirmed face image to the POS server 4. That is, the processor 31 controls the wireless unit 37 so that the data of the above confirmed face image is transmitted to the POS server 4 via the docking station 2.

The data of the face image which has been confirmed to be included in the photographed frame image is transmitted to the docking station 2 using wireless communication, by the control of the wireless unit 37.

And the data of the above confirmed face image is received by the wireless unit 54, and is further transmitted to the POS server 4 via a wired LAN by the action of the wired LAN unit 56.

The POS server 4 which has received the data of the above confirmed face image accesses the person-in-charge database 5.

The POS server 4 determines whether or not data of a face image similar to the data of the above confirmed face image is stored in the person-in-charge database 5.

When the data of the similar face image is stored in the person-in-charge database 5, the POS server 4 determines that a person of the above confirmed face image is the above-described person in charge of customer service.

When the data of the similar face image is not stored in the person-in-charge database 5, the POS server 4 determines that a person of the above confirmed face image is not the above-described person in charge of customer service.

The POS server 4 transmits response data indicating this determination result to the tablet terminal 1 that is a transmission source of the data of the above confirmed face image.

The above-described response data is transmitted from the POS server 4 to the docking station 2 via a wired LAN.

Further, this response data is transmitted by wireless to the tablet terminal 1, via the wireless unit 54 of the docking station 2.

After the data of the above confirmed face image has been transmitted to the POS server 4 in Act11, the processing of the processor 31 proceeds to Act12.

In Act12, the processor 31 waits, until the processor 31 receives the above-described response data.

When the response data is received within a prescribed setting time via the wireless unit 37 (YES in Act12), the processing of the processor 31 proceeds to Act13.

In Act13, the processor 31 performs user authentication, based on the above-described response data. That is, the processor 31 specifies whether or not the above-described person (operator) who has demounted is a person in charge of customer service (specific operator), based on the above-described determination result which the above-described response data indicates.

When it is specified that the above-described person who has demounted is a person in charge of customer service, the processor 31 approves the above-described person who has demounted as a specific operator of the tablet terminal 1.

When it is specified that the above-described person who has demounted is not a person in charge of customer service, the processor 31 does not approve the above-described person who has demounted as a specific operator of the tablet terminal 1.

When the above-described person who has demounted is approved as a specific operator of the tablet terminal 1 (YES in Act13), the processing of the processor 31 proceeds to Act14.

In Act14, the processing of the processor 31 changes the level data L to "1".

On the other hand, when the above-described person who has demounted is not approved as a specific operator of the tablet terminal 1 (NO in Act13), the processing of the processor 31 proceeds to Act15.

In Act15, the processor 31 changes the level data L to "9".

In addition, also when the retry counter C exceeds the prescribed value n in the above-described Act9 (YES in Act9), or when the response data has not been received within the prescribed time in the above-described Act12 (NO in Act12), the processing of the processor 31 proceeds to the above-described Act15.

In addition, after the level data L has been changed to "1" in the above-described Act14, or the level data L has been changed to "9" in the above-described Act15, the processing of the processor 31 returns to Act2.

As described above, when the tablet terminal 1 is demounted from the docking station 2, photographing is performed by the camera 42 of its tablet terminal 1.

And, user authentication is performed based on a face image which is confirmed to be included in the above-described photographing image.

And when the person who has demounted is approved as a specific operator of the tablet terminal 1, the level data L becomes "1". On the other hand, when the person who has demounted is not approved as a specific operator of the tablet terminal 1, the level data L becomes "9".

In most cases, when the tablet terminal 1 is demounted from the docking station 2, a face image of the person who has demounted is photographed by the camera 42.

Accordingly, when the relevant person has been the above-described person in charge of customer service, the level data L of the tablet terminal 1 becomes "1".

In contrast, when the person who has demounted has been a person except the person in charge of customer service, the level data L of the tablet terminal 1 becomes "9".

The level data L which has been changed to "1" or "9" holds its value, until the tablet terminal 1 is mounted on the docking station 2. When the tablet terminal 1 is mounted on the docking station 2, the level data L is changed to "0".

A main portion of a processing which the processor 31 executes, in accordance with the first security control program will be described using FIG. 5 and FIG. 6.

The first security control program is a program which the processor 31 executes for displaying a sign-on screen described later, and for performing user authentication of a person who has signed on.

Further, the first security control program is a program which the processor 31 executes for displaying a job selection menu screen described later, and for performing user authentication of a person who has selected a job.

Figure 5:
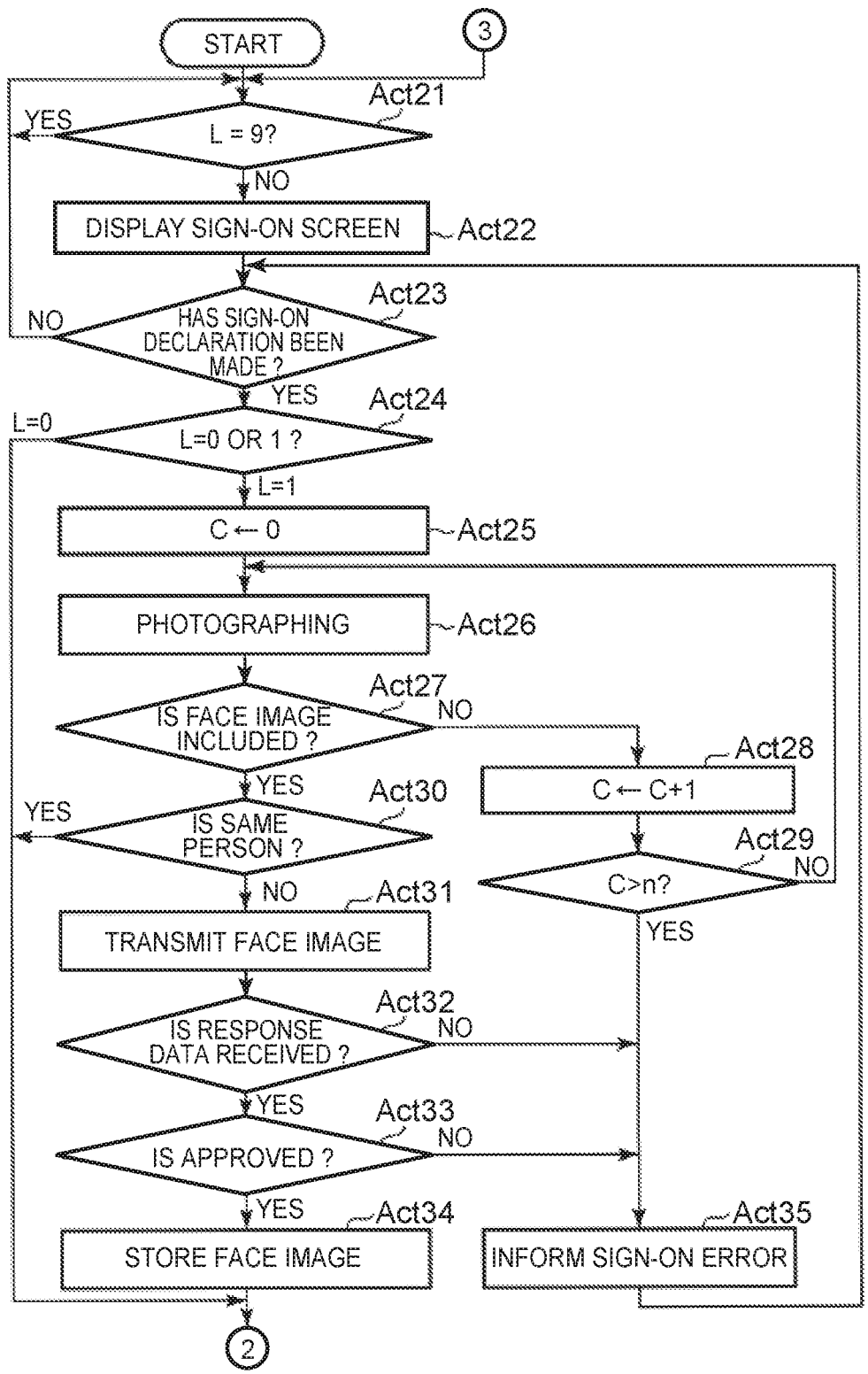
FIG. 5 is a flow chart showing a control processing for security management which the processor of the tablet terminal according to the embodiment executes.

When the first security control program starts up, the processor 31 starts processings of a procedure shown in a flow chart of FIG. 5.

To begin with, in Act21, the processor 31 confirms whether the level data L is "9".

When it is confirmed that the level data L is "9" (YES in Act21), the processor executes the processing of Act21 again.

Accordingly, the processor 31 waits, until the level data L is changed to "0" or "1" which is other than "9".

When it is confirmed that the level data L is not "9", that is, the level data L is changed to a value other than "9", in the above-described Act21 (NO in Act21), the processing of the processor 31 proceeds to Act22.

In Act22, the processor 31 makes the touch panel 35 display a sign-on screen.

The sign-on screen is a screen which supports a sign-on operation for a person in charge of customer service to declare an operation start of the tablet terminal 1.

In the sign-on screen, a soft key image for the person in charge of customer service to input the own person-in-charge ID is included.

After the sign-on image has been displayed, the processing of the processor 31 proceeds to Act23.

In Act23, the processor 31 confirms whether or not a sign-on declaration has been made in the sign-on screen.

When it is confirmed that a sign-on declaration has not been made (NO in Act23), the processing of the processor 31 returns to the above-described Act21.

In the above-described Act21, the processor 31 confirms again whether the level data L is "9", and when the level data L is not "9" (NO in Act21), the processor 31 executes the processings of the above-described Act22 and the above-described Act23.

In contrast, when it is confirmed that the level data L is "9" (YES in Act21), the processor 31 executes the processing of Act21 again. At this time, the processor 31 erases the sign-on screen.

As described in the processing of the above-described security level setting program, the tablet terminal 1 in the state that the level data L is "9" is mounted on the docking station 2, the level data L is changed to "0" (refer to Act3 of FIG. 4).

In accordance with this change, in the tablet terminal 1, the above-described sign-on screen is displayed on the touch panel 35.

Here, when the above-described person in charge of customer service has demounted the tablet terminal 1 from the docking station 2, the level data L is changed to "1" (refer to Act14 of FIG. 4).

At this time, the sign-on screen is continuously displayed.

On the contrary, when a person other than the above-described person in charge of customer service has demounted the tablet terminal 1 from the docking station 2, the level data L is changed to "9" (refer to Act15 of FIG. 4).

Accordingly, the sign-on screen is erased.

As a result, a person, other than the above-described person in charge of customer service, who has demounted the tablet terminal 1 from the docking station 2 cannot perform a sign-on operation to the tablet terminal 1.

If the person other than the above-described person in charge of customer service cannot perform a sign-on operation, the person cannot use the tablet terminal 1.

The person in charge of customer service can perform a sign-on operation to the tablet terminal 1 on which the sign-on screen is displayed. That is, the person in charge of customer service inputs an own person-in-charge ID by a touch operation of the touch panel 35, to declare sign-on.

When it is confirmed that the sign-on declaration has been made by the person in charge of customer service, in the above-described Act23, (YES in Act23), the processing of the processor 31 proceeds to Act24.

In Act24, the processor 31 confirms the level data L.

Here, when it is confirmed that the level data L is "0", that is, when the sign-on declaration by the person in charge of customer service has been made by the tablet terminal 1 mounted on the docking station 2, the processing of the processor 31 proceeds to Act41 (refer to FIG. 6) described later.

In contrast, when it is confirmed that the level data L is "1", in the above-described Act24, that is, when the tablet terminal 1 has been demounted from the docking station 2 by the person in charge of customer service, and when the sign-on declaration has been made by the demounted tablet terminal 1, the processing of the processor 31 proceeds to Act25. In addition, in this case, it is not clear whether or not the person who has made the sign-on declaration is the same person as the above-described person in charge of customer service.

In Act25, the processor 31 resets the above-described retry counter C to "0".

After the retry counter C has been reset, the processing of the processor 31 proceeds to Act26.

In Act26, the processor 31 commands the camera controller 39 to start photographing.

Having received this command, the camera controller 39 starts up the camera 42. Then, the processor 31 takes in a photographed frame image by the camera controller 39, and writes the frame image in the image buffer of the RAM 33.

After the above-described frame image has been written into the image buffer, the processing of the processor 31 proceeds to Act27.

In Act27, the processor 31 analyzes the frame image written in the image buffer, and confirms whether or not a face image is included in the frame image.

For example, the processor 31 extracts an outline of an object displayed in the frame image, and determines whether or not this outline and color information in the outline are similar to a pattern of a previously set face image, to confirm the presence or absence of a face image in the frame image.

When it is confirmed that a face image is not included in the frame image (NO in Act27), the processing of the processor 31 proceeds to Act28.

In Act28, the processor 31 counts up the retry counter C by "1".

After the retry counter C has been counted up, the processing of the processor 31 proceeds to Act29.

In Act29, the processor 31 confirms whether or not a value of the retry counter C has exceeded a prescribed value n (n>1).

When it is confirmed that the value of the retry counter C has not exceeded the prescribed value n (NO in Act29), the processing of the processor 31 returns to the above-described Act26.

That is, the processor 31 commands the camera controller 39 to start photographing. Accordingly, the processor 31 makes the camera 42 retry photographing actions of maximum n times, until a face image is included in the frame image photographed by the camera 42.

When it is confirmed that a face image is included in the frame image during photographing actions of the above-described n times (YES in Act27), the processing of the processor 31 proceeds to Act30.

In Act30, the processor 31 confirms whether a person of the above confirmed face image is the same as a person of the face image stored in the prescribed area of the RAM 33.

That is, the processor 31 confirms whether a person who has demounted the tablet terminal 1 from the docking station 2 is the same person as a person who has made the sign-on declaration on the relevant tablet terminal 1.

For example, the processor 31 examines a similarity between the face image photographed this time and the previously stored face image. And, when the similarity exceeds 80%, for example, the processor 31 recognizes that they are the above-described same person.

When it is confirmed that they are the above-described same person (YES in Act30), the processing of the processor 31 proceeds to Act41 described later.

In contrast, when it is confirmed that they are not the above-described same person (NO in Act30), the processing of the processor 31 proceeds to Act31.

In Act31, the processor 31 transmits data of the above-described face image to the POS server 4. That is, the processor 31 controls the wireless unit 37 so that the data of the above-described face image is transmitted to the POS server 4 via the docking station 2.

The data of the face image which has been confirmed to be included in the photographed frame image is transmitted to the docking station 2 using wireless communication, by the control of the wireless communication unit 37.

And the data of the face image is received by the wireless unit 54.

Further, the data of the face image is transmitted to the POS server 4 via a wired LAN by the action of the wired LAN unit 56.

The POS server 4 which has received the data of the above confirmed face image accesses the person-in-charge database 5. The POS server 4 determines whether or not data of a face image similar to the data of the above confirmed face image is stored in the person-in-charge database 5.

When the data of the similar face image is stored in the person-in-charge database 5, the POS server 4 determines that a person of the above confirmed face image is the above-described person in charge of customer service.

When the data of the similar face image is not stored in the person-in-charge database 5, the POS server 4 determines that a person of the above confirmed face image is not the above-described person in charge of customer service.

The POS server 4 transmits response data indicating this determination result to the tablet terminal 1 that is a transmission source of the data of the face image.

The above-described response data is transmitted from the POS server 4 to the docking station 2 via a wired LAN.

Further, this response data is transmitted by wireless to the tablet terminal 1 via the wireless unit 54 of the docking station 2.

After the data of the above confirmed face image has been transmitted to the POS server 4 in Act31, the processing of the processor 31 proceeds to Act32.

In Act32, the processor 31 waits, until the processor 31 receives the response data.

When the response data is received within a prescribed setting time via the wireless unit 37 (YES in Act32), the processing of the processor 31 proceeds to Act33.

In Act33, the processor 31 performs user authentication, based on the above-described response data. That is, the processor 31 specifies whether or not the person who has made the above-described sign-on declaration on the demounted tablet terminal 1 is a person in charge of customer service, based on the above-described determination result which the response data indicates.

When it is specified that the person who has made the above-described sign-on declaration is a person in charge of customer service, the processor 31 approves the person who has made the above-described sign-on declaration as a specific operator of the tablet terminal 1.

When it is specified that the person who has made the above-described sign-on declaration is not a person in charge of customer service, the processor 31 does not approve the person who has made the above-described sign-on declaration as a specific operator of the tablet terminal 1.

When the person who has made the above-described sign-on declaration is approved as a specific operator of the tablet terminal 1 (YES in Act33), the processing of the processor 31 proceeds to Act34.

In Act34, the processor 31 overwrites the data of the face image which has been confirmed to be included in the above photographed frame image in a prescribe area of the RAM 33.

After the data of above confirmed face image has been stored, the processing of the processor 31 proceeds to Act41 described later.

On the other hand, when the person who has made the above-described sign-on declaration is not approved as a specific operator of the tablet terminal 1 (NO in Act33), the processing of the processor 31 proceeds to Act35.

In Act35, the processing of the processor 31 informs a sign-on error.

For example, the processor 31 makes the touch panel 35 display a message to warn that the sign-on is an error.

At this time, the processor 31 may generate a warning sound from the tablet terminal 1.

In addition, also when the retry counter C exceeds the prescribed value n in the above-described Act29 (YES in Act 29), or when the response data is not received within the prescribed time in Act32 (NO in Act32), the processing of the processor 31 proceeds to the above-described Act35.

In the above-described Act35, the processor 35 informs a sign-on error, as described above.

After the sign-on error has been informed, the processing of the processor 31 returns to Act23.

Figure 6:
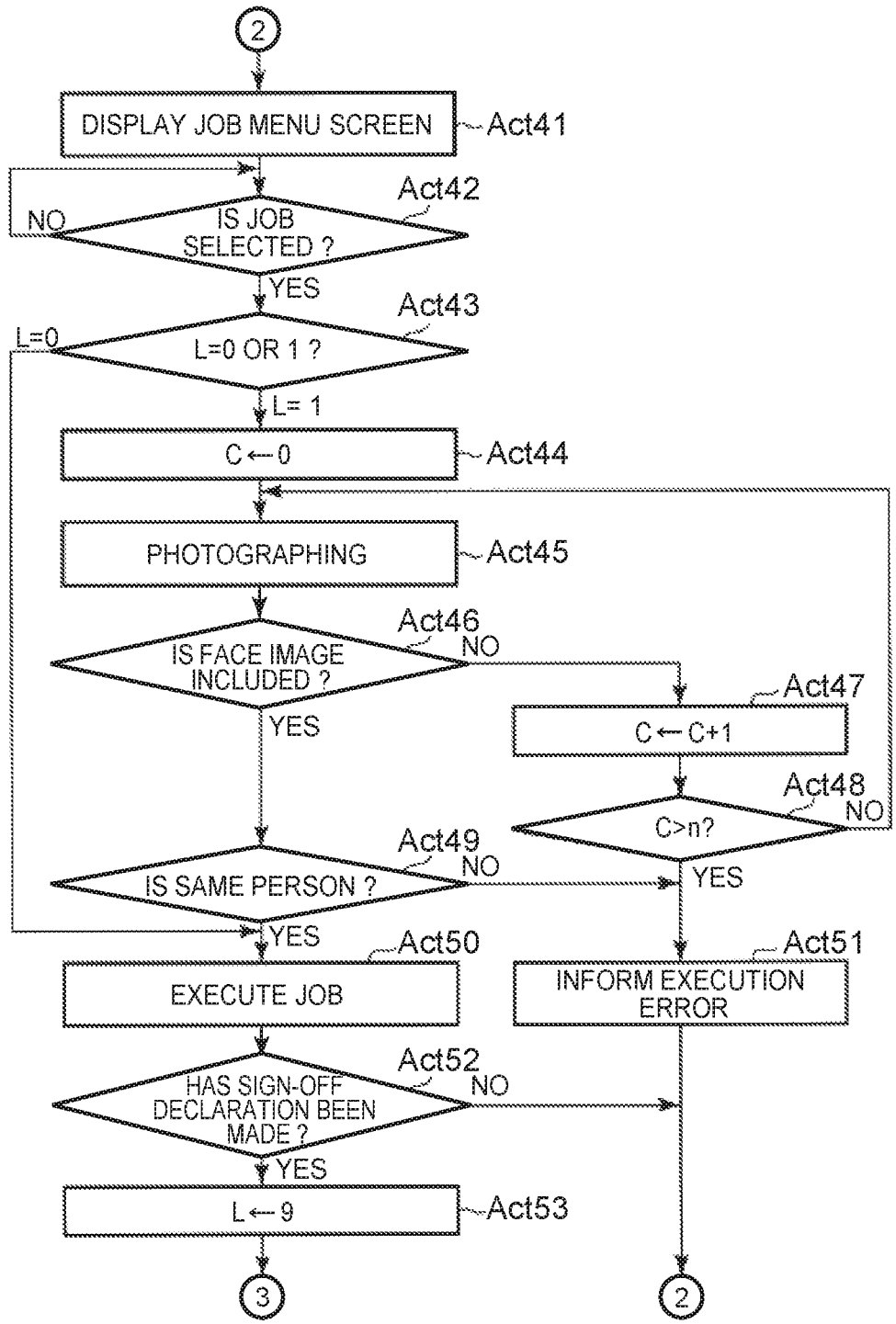
FIG. 6 is a flow chart showing a control processing for security management which the processor of the tablet terminal according to the embodiment executes.

On the other hand, in Act41 of FIG. 6, the processor 31 changes the screen of the touch panel 35 from the sign-on screen to a job menu screen.

The job menu screen is a screen which accepts a selection input of various job modes relating to commercial transaction executable by the tablet terminal 1, such as sales registration, return registration, inspection, settlement.

After the job menu screen has been displayed, the processing of the processor 31 proceeds to Act42.

In Act42, the processor 31 determines whether or not any of the above-described jobs has been selected.

The processor 31 waits, until it determines that any of the jobs has been selected.

When it is determined that any job has been selected by a touch input of the touch panel 35 (YES in Act42), the processing of the processor 31 proceeds to Act43.

In Act43, the processor 31 confirms the level data L.

Here, when it is confirmed that the level data L is "0", that is, when a job is selected in the tablet terminal 1 mounted on the docking station 2, the processing of the processor 31 proceeds to Act50 described later.

In contrast, when it is confirmed that the level data L is "1", that is, when a job is selected in the tablet terminal 1 demounted from the docking station 2, the processing of the processor 31 proceeds to Act44.

In Act44, the processor 31 resets the above-described retry counter C to "0".

After the retry counter C has been reset, the processing of the processor 31 proceeds to Act45.

In Act45, the processor 31 commands the camera controller 39 to start photographing.

Having received this command, the camera controller 39 starts up the camera 42.

The processor 31 takes in a photographed frame image by the camera controller 39, and writes the frame image in the image buffer of the RAM 33.

After the above-described frame image has been written into the image buffer, the processing of the processor 31 proceeds to Act46.

In Act46, the processor 31 analyzes the above-described frame image, and confirms whether a face image is included.

For example, the processor 31 extracts an outline of an object displayed in the frame image, and determines whether or not this outline and color information in the outline are similar to a pattern of a previously set face image, to confirm the presence or absence of a face image.

When it is confirmed that a face image is not included in the above-described frame image (NO in Act46), the processing of the processor 31 proceeds to Act47.

In Act47, the processor 31 counts up the retry counter C by "1".

After the retry counter C has been counted up, the processing of the processor 31 proceeds to Act48.

In Act48, the processor 31 confirms whether or not the retry counter C has exceeded a prescribed value n (n>1).

When it is confirmed that the value of the retry counter C has not exceeded the prescribed value n (NO in Act48), the processing of the processor 31 returns to Act45.

That is, the processor 31 commands the camera controller 39 to start photographing again.

Accordingly, the processor 31 makes the camera 42 retry photographing actions of maximum n times until a face image is included in the image photographed by the camera 42.

When it is confirmed that a face image has been included in the above photographed frame image during the above-described photographing actions of n times (YES in Act46), the processing of the processor 31 proceeds to Act49.

In Act49, the processor 31 confirms whether a person of the above confirmed face image is the same as a person of the face image (refer to Act34) stored in the prescribed area of the RAM 33.

That is, the processor 31 confirms whether a person who has made the sign-on declaration in the tablet terminal 1 is the same as a person who has selected a job.

For example, the processor 31 examines a similarity between the face image photographed in the above-described Act26 and the previously stored face image.

When the above-described similarity exceeds 80%, for example, the processor 31 recognizes that a person of the face image photographed in the above-described Act26 and a person of the previously stored face image are the same person.

When it is confirmed that a person of the above confirmed face image is the same person as a person of the face image stored in the RAM 33 (YES in Act49), the processing of the processor 31 proceeds to Act50 described later.

In contrast, when it is confirmed that a person of the above confirmed face image is not the same person as a person of the face image stored in the RAM 33 (NO in Act49), the processing of the processor 31 proceeds to Act51.

In Act51, the processor 31 informs an execution error of a job.

For example, the processor 31 makes the touch panel 35 display a message to warn that the above selected job (refer to Act42) cannot be executed.

At this time, the processor 31 may generate a warning sound from the tablet terminal 1.

Also, when it is confirmed that the retry counter C has exceeded the prescribed value n (YES in Act48), the processor 31 informs an execution error of a job, in the above-described Act51.

After the execution error has been informed, the processing of the processor 31 returns to the processing of Act41.

On the other hand, in Act50, the processor 31 executes an information processing of the above selected job (refer to Act42).

When execution of a sales registration job is selected in the above-described Act42, for example, the processor 31 changes the screen of the touch panel 35 to a commodity registration screen.

The processor 31 accepts an input of commodity sales data via the touch panel 35.

When the commodity sales data is inputted, the processor 31 performs a registration processing of the commodity sales data.

After the above-described registration processing has been performed, when an operation to declare completion in one commercial transaction is performed via the touch panel 35, the processor 31 changes the screen of the touch panel 35 to an accounting screen.

The processor 31 accepts an input of accounting data via the above-described accounting screen.

When settlement by a credit card is declared via the above-described accounting screen, for example, and further data of the credit card is read by the reader/writer 14, the processor 31 executes a card authentication processing.

When the above-described card authentication processing is executed, the processor 31 transmits an issue command of a receipt to the docking station 2 using wireless communication.

The docking station 2 which has received this command drives the printer 61 to issue a receipt.

Further, data of the commercial transaction (for example, commodity sales data, accounting data, and so on) which has been processed by the tablet terminal 1 is transmitted to the docking station 2 using wireless communication.

Further, the data of the above-described commercial transaction transmitted to the docking station 2 is transmitted from the docking station 2 to the POS server 4 via a wired LAN.

After the information processing of the job has been executed in the above-described Act50, as described above, the processing of the processor 31 proceeds to Act52.

In Act52, the processor 31 confirms whether or not a sign-off declaration has been made.

When it is confirmed that a sign-off declaration has not been made (NO in Act52), the processing of the processor 31 returns to Act41.

Accordingly, in the tablet terminal 1, it becomes possible to process a job next to the job performed in the above-described Act50.

In contrast, when it is confirmed that a sign-off declaration has been made (Yes in Act52), the processing of the processor 31 proceeds to Act53.

In Act53, the processor 31 changes the value of the level data L to "9".

Accordingly, any operation is inhibited on the tablet terminal 1 on which a sign-off declaration has been made, until the tablet terminal 1 is mounted on the docking station 2.

After the level data L has been changed to "9", the processing of the processor 31 returns to Act41.

In addition, when sign-off is made in the state that the tablet terminal 1 is mounted on the docking station 2, the value of the level data L is changed from "9" to "0", by the processings of the above-described Act2 and Act3 of FIG. 4.

Accordingly, the sign-on screen is displayed again, by the processings of the above-described Act21 and Act22.

The processor 31 of the tablet terminal 1 functions as authentication acquisition means for acquiring face image information (biological information) of an operator to be photographed by the camera 42, as information necessary for user authentication, by the processings of Act5-Act113 of FIG. 4, the processings of Act25-Act33 of FIG. 5, the processings of Act44-Act49 of FIG. 6 which have been described above.

In addition, when the docking station 2 is connected to the connector 15, the tablet terminal 1, permits an operation input to the touch panel 35, without taking in information as the above-described authentication acquisition means, by the processings of FIG. 4 (the processings of Act1-Act4, Act14, and Act15), the processing of Act24 of FIG. 5 and the processing of Act43 of FIG. 6.

In contrast, when the docking station 2 is not connected to the connector 15, the tablet terminal 1 takes in information as the above-described authentication means, and permits an operation input to the touch panel 35 as a condition that user approval is made.

That is, the tablet terminal 1 functions as control means for controlling permission of the above-described operation input.

Next, a main portion of a processing which the processor 31 executes, in accordance with the second security control program will be described using FIG. 7.

Figure 7:
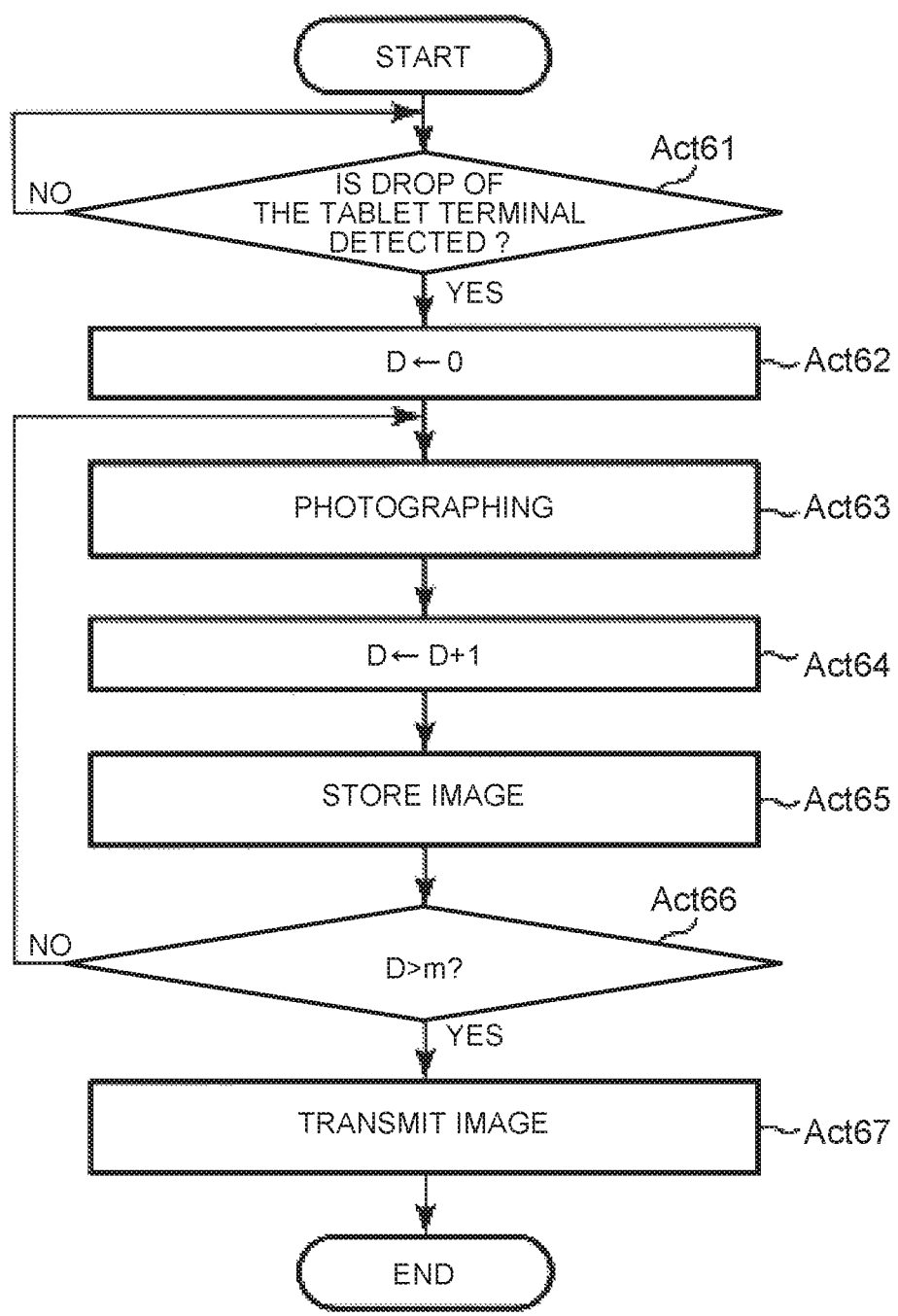
FIG. 7 is a flow chart showing a control processing for security management which the processor of the tablet terminal according to the embodiment executes.

When the second security control program starts up, the processor 31 starts processings of a procedure indicated in a flow chart of FIG. 7.

To begin with, in Act61, the processor 31 confirms a detection signal of the drop sensor 43.

When it is confirmed that drop of the tablet terminal 1 is not detected by the drop sensor 43, based on the above-described detection signal (NO in Act61), the processor 31 executes the processing of Act61 again.

Accordingly, the processor 31 waits, until it confirms that drop of the tablet terminal 1 is detected.

On the other hand, when it is confirmed that drop of the tablet terminal 1 is detected by the drop sensor 43 (YES in Act61), the processing of the processor 31 proceeds to Act62.

In Act62, the processor 31 resets a frequency counter D to "0". The frequency counter D is stored in the RAM 33, for example.

After the frequency counter D has been reset, the processing of the processor 31 proceeds to Act63.

In Act63, the processor 31 commands the camera controller 39 to start photographing.

Having received this command, the camera controller 39 starts up the camera 42.

The processor 31 takes in a frame image photographed by the camera 41 via the camera controller 39, and writes the frame image in the image buffer of the RAM 33.

When the above-described frame image is written into the image buffer, the processing of the processor 31 proceeds to Act64.

In Act64, the processor 31 counts up the frequency counter D by "1".

When the frequency counter D has been counted up, the processing of the processor 31 proceeds to Act65.

In Act65, the processor 31 stores the frame image which has been written into the above-described image buffer in the flash ROM 32, in association with the value of the frequency counter D.

After the frame image has been stored in the ROM 32 in the above-described Act65, the processing of the processor 31 proceeds to Act66.

In Act66, the processor 31 confirms whether or not the frequency counter D has exceeded a prescribed value m>1).

When it is confirmed that the value of the frequency counter D has not exceeded the prescribed value m (NO in Act66), the processing of the processor 31 returns to the above-described to Act63.

That is, the processor 31 commands the camera controller 39 to start photographing again.

Accordingly, the processor 31 sequentially stores the frame images which have been photographed repeatedly by the camera 42 for m times into the flash ROM 32.

When it is confirmed that the value of the frequency counter D has exceeded the prescribed value m (YES in Act66), the processing of the processor 31 proceeds to Act67.

In Act67, the processor 31 transmits data of the frame image stored in the flash ROM 32 to the POS server 4.

That is, the processor 31 controls the wireless unit 37 so as to transmit data of the above-described frame image to the POS server 4 via the docking station 2.

More specifically, data of the frame image stored in the flash ROM 32 is firstly transmitted from the tablet terminal 1 to the docking station 2, by wireless communication via the wireless unit 37, by the above-described control.

The data of the above-described frame image is received by the docking station 2, via the wireless unit 54.

Further, the data of the above-described frame image is transmitted from the docking station 2 to the POS server 4 via a wired LAN, by the action of the wired LAN unit 56.

The POS server 4 stores the data of the relevant frame image in an image database not shown.

As described above, when the tablet terminal 1 of the present embodiment is in the state to be mounted on the docking station 2, since the level data L of the security level is "0" (refer to Act3 and Act4), the sign-on screen is displayed on the touch panel 35 (refer to Act22).

When an operator performs a sign-on operation in the state that the sign-on screen is displayed on the touch panel 35, the screen of the touch panel 35 is changed from the sign-on screen to the job menu screen.

Accordingly, a person in charge of customer service who can perform a sign-on operation, can perform various jobs relating to commercial transaction, using the tablet terminal 1 mounted on the docking station 2.

On the other hand, when the tablet terminal 1 is demounted from the docking station 2, the camera 42 operates (refer to Act6).

And when a face image of an operator who has demounted the tablet terminal 1 is photographed by this camera 42, user authentication is made based on the face image (refer to Act13).

Here, a person who has demounted the tablet terminal 1 is a person in charge of customer service whose authentication data is stored in the person-in-charge database 5, the person who has demounted the tablet terminal 1 is approved as a specific operator of the tablet terminal 1 (refer to YES in Act13).

When the person who has demounted the tablet terminal 1 is approved as the specific operator of the tablet terminal 1, the level data L of the security level is changed to "1".

At this time, the screen of the touch panel 35 is not changed.

Accordingly, when the screen of the above-described touch panel 35 is the sign-on screen (refer to Act22), the person in charge of customer service (specific operator) who is the person who has demounted the tablet terminal 1 can perform a sign-on operation.

When the screen of the touch panel 35 is the job menu screen (refer to Act41), the person in charge of customer service who is the person who has demounted the tablet terminal 1 can select a desired job.

However, when the sign-on declaration has been made, and when the tablet terminal 1 is demounted from the docking station 2 (refer to L=1 in Act24), the camera operates again in the tablet terminal 1 (refer to Act26).

And, when a face image of a person who has made a sign-on declaration is photographed by this camera 42, user authentication is performed based on the face image.

Here, a person who has made the sign-on declaration is a person who has demounted the tablet terminal 1 from the docking station 2 (refer to YES in Act30), since the person who has demounted the tablet terminal 1 from the docking station 2 has already been approved as a specific operator of the tablet terminal 1 (refer to YES in Act33), the person who has made the sign-on declaration is approved as a specific operator of the tablet terminal 1. Accordingly, the job menu screen is displayed on the tablet terminal 1 (refer to Act41).

Further, when a person who has made the sign-on declaration is not the same person as a user who has demounted the tablet terminal 1 from the docking station 2, but is a person in charge of customer service whose authentication data is stored in the person-in-charge database 5 as a specific operator, the person who has made the sign-on declaration is approved as a user of the tablet terminal 1 (refer to YES in Act33), and the job menu screen is displayed on the tablet terminal 1 (refer to Act41)

Similarly, when a selection operation of a job is performed from the above-described job menu screen, and when the tablet terminal 1 has been demounted from the docking station 2 (refer to L=1 in Act43), the camera 42 operates again in the tablet terminal 1 (refer to Act45).

And when a face image of a person who has performed a selection operation of a job is photographed by this camera 42, user authentication is performed based on the face image.

In this case, only when a person who has performed the selection operation of a job is the same person as a person who has made the sign-on declaration, and is approved as a user of the tablet terminal 1 (refer to YES in Act49), the processor executes the selected job.

Accordingly, even when a person who has performed the selection operation of a job is a specific operator (person in charge of customer service) whose authentication data is stored in the person-in-charge database, but when a person who has performed the selection operation of a job is different from a person in charge of customer service who has made the sign-on declaration, the tablet terminal 1 becomes in an execution error, and cannot select a job.

Accordingly, when a person other than a person who is registered in the person-in-charge database 5 as a specific operator (person in charge of customer service) has demounted the tablet terminal 1 from the docking station 2, the tablet terminal 1 prohibits an operation of any person.

Further, even when a person who is registered in the person-in-charge database 5 as a person in charge of customer service has demounted the tablet terminal 1 from the docking station 2, when a person who has made the sign-on declaration and has performed a selection operation of a job menu is not a person in charge of customer service, the tablet terminal 1 prohibits an operation of any person.

Accordingly, according to the embodiment as described above, it is possible to prevent in advance the tablet terminal 1 which has been demounted from the docking station 2 from being illegally used.

In addition, the tablet terminal 1 in which the level data L becomes "9" and an operation thereof is inhibited is connected to the docking station 2, and thereby the level data L becomes "0", and accordingly the sign-on screen is displayed (refer to Act21).

Accordingly, if a person who tries to operate the tablet terminal 1 is a person in charge of customer service, the person can use the tablet terminal 1.

In addition, when a person who operates the tablet terminal 1 demounted from the docking station 2 has dropped the tablet terminal 1 by mistake, the camera 42 operates to photograph a plurality of images, and the tablet terminal 1 stores them in the flash ROM 32.

In addition, the image data is transmitted to the POS server 4 using wireless communication.

Accordingly, a person who performs maintenance of the tablet terminal 1, for example, analyzes the image data of the flash ROM 32 or the image data transmitted to the POS server 4, and thereby can easily discriminate whether or not the tablet terminal 1 has dropped.

In addition, the present embodiment is not limited to the configuration as described above.

For example, in the present embodiment, a face image has been acquired from an image photographed using the camera 42 incorporated in the tablet terminal 1, and the user authentication has been made based on this face image, but a method of user authentication is not limited to a method using a face image.

As a method of user authentication, an iris in a pupil of an operator is recognized from a photographed image, and user authentication may be performed based on this iris information. Or, a method of user authentication may be a method using biological information such as a fingerprint, a vein of an operator.

In addition, the authentication acquisition means is not limited to acquisition means of biological information, but may be acquisition means of a password in the case of password authentication, for example.

In addition, in the present embodiment, the POS server 4 accesses the person-in-charge database 5, but the tablet terminal 1 may directly access the person-in-charge database 5 to perform user authentication.

Or, the tablet terminal 1 is provided with a large capacity auxiliary storage medium, and biological information of an operator capable of operating the relevant tablet terminal 1 is previously registered in the auxiliary storage medium, and thereby the tablet terminal 1 may perform user authentication by itself.

In this case, since a specific operator capable of operating the tablet terminal 1 can be set for each tablet terminal 1, security can be further enhanced.

In addition, in the case of user authentication at the sign-on time, the processor 31 may collate a face image linked to an ID of a person in charge who has signed on with a face image photographed by the camera 42, to perform user authentication.

In addition, the camera 42 may photograph a moving picture.

In addition, a case that the present embodiment is applied to the tablet terminal 1 which performs data processing of commercial transaction has been described, but an information processing apparatus to which the present embodiment is applicable is not limited to the tablet terminal 1.

An information processing apparatus to which the present embodiment is applicable may be an information processing apparatus detachable to the docking station, such as a smartphone.

In addition, assignment of an information processing apparatus is generally performed in the state that a program such as a security program is store in a ROM.

But without being limited to this, a security program and so on which have been assigned separately from a computer device may be written in a writable storage device provided in the computer device, in accordance with an operation by a specific operator or the like.

Assignment of a security program or the like can be performed in the state to be recorded in a removable recording medium, or by communication via a network.

If the recording medium can store a program and readable by the apparatus, such as a CD-ROM, a memory card, its form does not matter.

In addition, a function which can be obtained by installing or downloading a program may be a matter which can realize the function in cooperation with an OS (Operating System) or the like inside the apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus which is removably mountable on a docking station, the information processing apparatus comprising:
    an input device to receive an operation input;
    an acquisition unit to acquire information indicating an operator when the apparatus is removed from the docking station, and to acquire information indicating an operator when the operation input is received while the apparatus is in a removed state; and
    a processor configured to:
        when the apparatus is mounted on the docking station, permit the operation input to be received in the input device without starting the acquisition unit,
        when the apparatus is removed from the docking station, start the acquisition unit and perform user authentication based on the information indicating the operator acquired when the apparatus is removed from the docking station, and
        when the operator indicated in the information acquired when the apparatus is removed from the docking station is approved as an authorized operator of the apparatus, based on a result of the user authentication, permit the operation input to be received in the input device.

2. The information processing apparatus according to claim 1, further comprising:
    a connector to electrically connect the apparatus to the docking station when the apparatus is mounted on the docking station; wherein the processor determines whether or not the apparatus is mounted on the docking station, based on an electrical state of the connector.

3. The information processing apparatus according to claim 2, further comprising:
    a wireless unit to perform wireless data communication with the docking station;
    wherein the processor is further configured to:
        transmit the information indicating the operator to the docking station using the wireless unit,
        receive determination data indicating a determination result whether or not an operator indicated in the information acquired by the acquisition unit is the authorized operator, from the docking station using the wireless unit, and
        perform the user authentication based on the received determination data.

4. The information processing apparatus according to claim 1, further comprising:
    a memory to store the information indicating the operator acquired by the acquisition unit;
    wherein the processor stores biological information of the relevant operator in the memory, as the information indicating the operator acquired by the acquisition unit.

5. The information processing apparatus according to claim 4, wherein:
    the acquisition unit includes a camera; and
    the processor is further configured to:
        when the apparatus is removed from the docking station, control the camera to capture an image,
        determine whether or not a face image is included in the image captured by the camera, as the biological information of the operator, and
        store information corresponding to the determined face image in the memory, as information necessary for the user authentication.

6. The information processing apparatus according to claim 5, wherein:
    the processor is further configured to:
        when a face image is determined to not be included in the image captured by the camera, control the camera to capture a subsequent image,
        determine whether or not a face is included in the subsequent image captured by the camera, and
        when a number of times that the camera captures an image that is determined to not include a face exceeds a predetermined number of times, control the input device to not receive the operation input.

7. The information processing apparatus according to claim 4, wherein:
    the acquisition unit includes a camera; and
    the processor is further configured to:
        when the apparatus is removed from the docking station, control the camera to capture an image, in accordance with a predetermined operation input being received in the input device,
        determine whether or not a face image is included in the image captured by the camera, as the biological information of the operator, and
        store information corresponding to the determined face image in the memory, as information necessary for the user authentication.

8. The information processing apparatus according to claim 7, wherein:
    the processor, performs the user authentication, in accordance with the predetermined operation input being received in the input device, based on:
        whether or not the face image included in the image by the camera when the predetermined operation input is received, and the face image stored in the memory before the predetermined operation input is received are face images of the same person.

9. The information processing apparatus according to claim 1, wherein:
    when the operator is not approved as the authorized operator of the apparatus, based on a result of the user authentication, the processor controls the input device to not receive the operation input until the apparatus is mounted on the docking station.

* * * * *